United States Patent
Emanuelsson et al.

(10) Patent No.: US 6,768,810 B2
(45) Date of Patent: Jul. 27, 2004

(54) SYSTEM AND METHOD FOR DETECTING ADDRESS FIELDS ON MAIL ITEMS

(75) Inventors: Paer Emanuelsson, Constance (DE); Bernd Klühe, Constance (DE); Harald Mebold, Constance (DE)

(73) Assignee: Siemens AG, München (DE)

( * ) Notice: Subject to any disclaimer, the term of this patent is extended or adjusted under 35 U.S.C. 154(b) by 0 days.

(21) Appl. No.: 10/277,145

(22) Filed: Oct. 22, 2002

(65) Prior Publication Data

US 2003/0044044 A1 Mar. 6, 2003

Related U.S. Application Data

(63) Continuation of application No. PCT/DE01/01614, filed on Apr. 26, 2001.

(30) Foreign Application Priority Data

May 4, 2000 (DE) .......................................... 100 21 734

(51) Int. Cl.[7] ................................................. G06K 9/00
(52) U.S. Cl. ....................................... 382/101; 382/311
(58) Field of Search ................................ 382/101, 102, 382/173, 176, 209, 217, 218, 282, 292, 309, 311

(56) References Cited

U.S. PATENT DOCUMENTS

| | | | | |
|---|---|---|---|---|
| 5,031,223 A | * | 7/1991 | Rosenbaum et al. ............ 382/1 |
| 5,159,667 A | * | 10/1992 | Borrey et al. ................ 395/148 |
| 5,697,504 A | * | 12/1997 | Hiramatsu et al. ........... 209/546 |
| 5,737,437 A | * | 4/1998 | Nakao et al. ................. 382/101 |
| 6,014,450 A | * | 1/2000 | Heilper et al. ............... 382/101 |
| 6,266,431 B1 | * | 7/2001 | Kiyono ........................ 382/101 |
| 6,360,001 B1 | * | 3/2002 | Berger et al. ................ 382/101 |

FOREIGN PATENT DOCUMENTS

| | | | | |
|---|---|---|---|---|
| DE | 196 24 977 | * | 1/1998 | ............ G06K/9/48 |
| DE | 196 46 522 | * | 5/1998 | ............ B07C/3/10 |
| EP | 0 589 119 A1 | * | 3/1994 | ............ B07C/3/10 |

* cited by examiner

*Primary Examiner*—Andrew W. Johns
(74) *Attorney, Agent, or Firm*—Jacob Eisenberg; Siemens Schweiz

(57) ABSTRACT

The present invention relates to a method and apparatus for reading address fields on mail items when the address field cannot be automatically read. Herein, when an address field cannot be read, a signature of the surface of the mail piece where the address field is believed to be is made. The signature is derived from a scanning the surface and forming a grid pattern of the larger typographical fields. A database is queried to determine if a match exists between the signature and another signature. If a match is found, the information is imported into the automatic reading process, the information assisting in the reading of the address field. If no match is found, the scanned image is manually encoded and this information is used.

12 Claims, 2 Drawing Sheets

SYSTEM AND METHOD FOR DETECTING ADDRESS FIELDS ON MAIL ITEMS

CROSS REFERENCE TO RELATED APPLICATIONS

The present application is a continuation of international application PCT/DE01/01614, filed Apr. 26, 2001, now published as WO 01/83124, and claims priority to German patent 10021734.6, filed on May 4, 2000, both of which are herein incorporated by reference.

BACKGROUND OF THE INVENTION

The invention concerns a method and apparatus for detecting address fields on mail pieces, wherein a digital image of the surface which shows the routing information of each mailed piece is produced, stored, and supplied to an OCR unit for automatic evaluation and the associated complete image of the surface which shows the routing information is further routed to a video coding device if the required address field cannot be clearly identified.

The automatic reading of routing information, particularly addresses on mail pieces, is well known in the art. Manual video coding is known from U.S. Pat. Nos. 5,031,223 and 5,697,504 (which are herein incorporated by reference) for items which could not be read automatically. In general, the mail items are presented on a graphic display during video coding and information is inputted manually by a data entry device such as a keyboard.

While the fields with the routing information, like for example receiver address, can generally be found easily and automatically read with letters, there are difficulties with the automatic location of fields for other types of mail pieces such as over sized letters (so called flats: newspapers, journals, catalogues) or packages because among other things the surfaces are relatively wide and the addresses are located on patterned or printed surfaces. This is particularly problematic because a complete stoppage of the automatic reading can be caused by a certain mail piece type where the address cannot be found. This tends to happen with over-sized letters and packages. For this reason, the location of the address is video coded. This method works as follows: an image of the mail piece is presented on the display of the video coding system and the coder selects a determined field where the address is located instead of inputting the address. This for instance may and preferably can occur such that the image is divided into segments according to the digit block of a keyboard, via a grid, and a segment is selected very quickly by a single confirming key stroke, wherein the required field is located (see DE 196 46 522 A1, which is incorporated herein by reference). This field returns then to the automatic reading process where in the address is being read.

However, the above described process includes several problems. First, the manual determination causes a certain delay for the system, which requires a sorting machine with a delay line. Such a machine, though, is often not particularly given for flats. Second, the task is of a very repetitive nature because similar mail pieces often occur in succession.

A solution is also known wherein the location of the required field is determined by cursor positioning and this position of the field is stored for the next mail piece. The OCR unit tries to read the address for the next mail piece and thereby to find the respective field as a first step. If this field can not be found, in particular the reading process is not successful, the automatic reading process with the stored position of the address field is restarted. After this reading process has also been unsuccessful, a video coding takes place (See EP 0 589 119 A1, which is incorporated herein by reference). With this, it is possible to only once input by video coding this address field which was not found by a major client and by the OCR unit at several subsequent mail pieces of the same type. If these mail pieces are not arranged successively, this method fails.

BACKGROUND OF THE INVENTION

The present invention is directed to a method and apparatus for reducing video coding expenditure for determining address fields to be recognized and read during the automatic reading process of mail handling. These and other advantages will become clear from the description and claims below.

The determination and storing of a signature of images for which the OCR unit could not identify the field with the routing information, together with the produced position of the field with the routing information, in a database, by video coding and the scanning of the database for consistent signatures for the determination of the position of the field, substantially shortens the process of the determination of the fields with the routing information, if the OCR unit could not find these fields, because mail items of the same type (signature) have to only be coded once. Therefore, sorting machines with short or insufficient delay or hold-up lines can be included into the video coding mode for the routing information.

It is advantageous, to feed data from several reading systems into a database by an electronic network, and to search respectively for consistent signatures from the reading systems in the database. Mail pieces of the same type have to thereby be video coded only once within the scope of these reading systems regarding the location of the field.

The present invention is further directed to a method for reading address fields of mail items, comprising the steps of: locating and reading said address field, if said address field cannot be located and read, scanning a surface of said mail item, said surface comprising said address field; forming a signature of said surface, said signature comprising position and outlines of a select number of typographic fields of said surface; searching a database for a match between said signature and another signature; where a match is found, importing field address information from said database associated with said another signature and repeating said step of locating and reading; and where a match is not found, forwarding scanned surface to an encoding device, manually encoding said surface, and storing said signature and address field information in said database.

The present invention is further directed to an apparatus for reading address fields of mail items, comprising: means for locating and reading said address field, means for determining if said address field cannot be located and read, and means for scanning a surface of said mail item if said address field cannot be located and read, said surface comprising said address field; means for forming a signature of said surface, said signature comprising position and outlines of a select number of typographic fields of said surface; means for searching a database for a match between said signature and another signature; means for determining if a match is found and means importing field address information from said database associated with said another signature and repeating said step of locating and reading where a match is found; and means for determining if a match is not found and means for forwarding scanned surface to an encoding device, manually encoding said surface, and storing said signature and address field information in said database if a match is not found.

BRIEF DESCRIPTION OF THE SEVERAL VIEWS OF THE DRAWINGS

The novel features and method steps believed characteristic of the invention are set out in the claims below. The invention itself however, as well as other features and advantages thereof, are best understood by reference to the detailed description, which follows, when read in conjunction with the accompanying drawing, wherein:

DETAILED DESCRIPTION OF THE INVENTION

Figure 1:
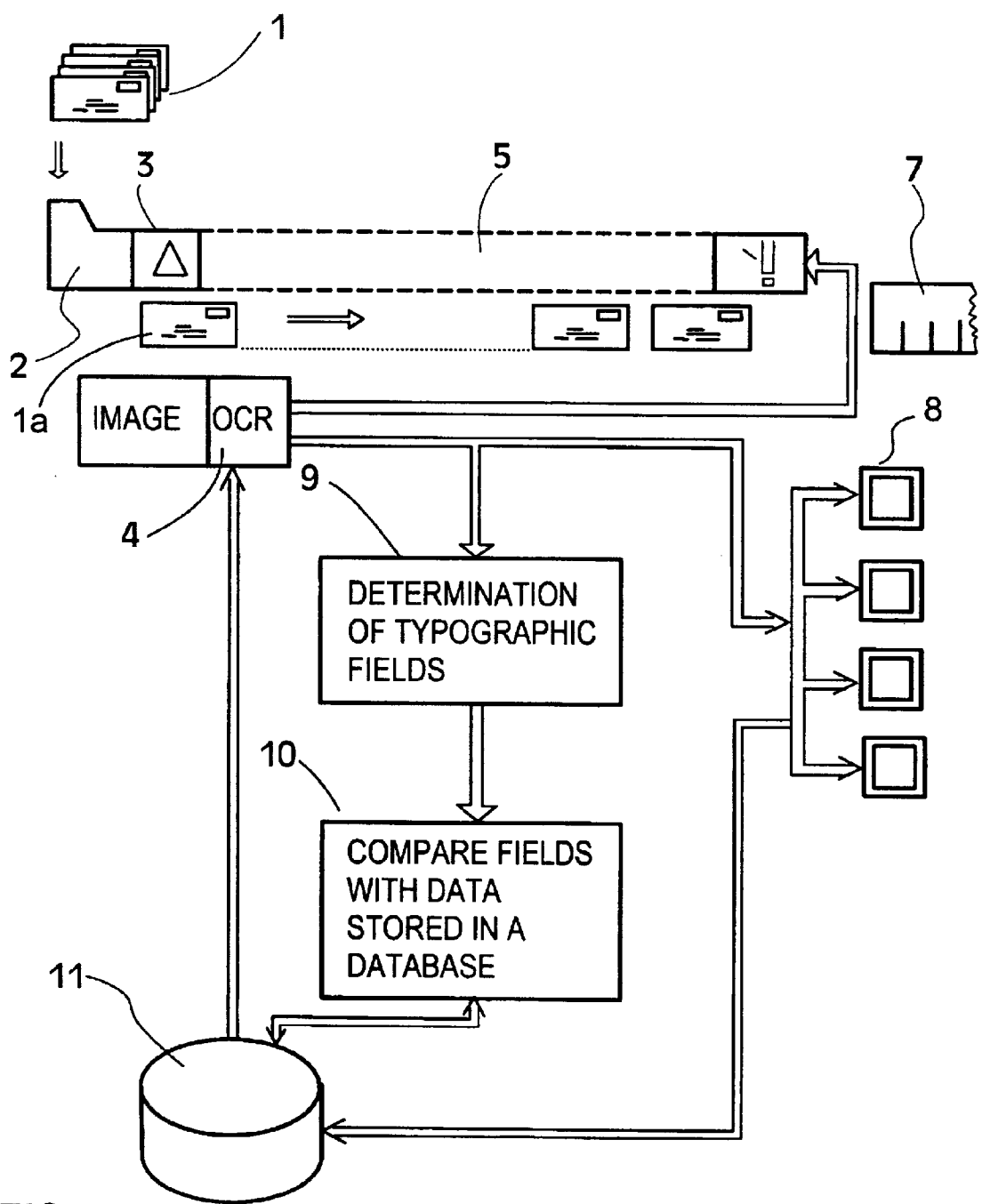
FIG. 1 the main components of a device according to the invention.

Mail items to be processed 1 are supplied to a scanning station by an input station at the device shown in FIG. 1, according to the invention, images are produced of at least one surface of the mail items 1a, which are supplied to an OCR unit 4 for the automatic reading of the address information and for the assignment of a corresponding code, particularly a bar code. After the scanning of the mail items, they come into a mechanical storage track 5, which can also be inapplicable in another embodiment, and are delivered from this to a printing station 6, where the mail items 1 are provided with a corresponding code of the read address information and then are sorted automatically in a device 7. The inclusion of the images on a video coding device 8 with one or several video coding places is known from the state of the art. Generally, the flow of mail items to be processed includes, to a determined percentage, mail items with non-automatically readable address information, in particular mail items whose address information is not automatically readable within a preset time. The maximum time which is available forte reading of the address information during a single passing of the mail items is furthermore determined byte running time of a mail item in the storage track, until it reaches the printing station 6. The images of such mail items 1, which address fields were not determined automatically within a preset time, are transmitted as signature to a device 9 for the automatic determination of positions and outlines of the for example 10 largest typographic fields. The signature is then transmitted to a comparator 10, which compares in a database 11 the stored signatures regarding their conformity or match with to determined current signature. Comparator 10 is part of an undisclosed control unit, which realizes the functional exchange of the data. If no conformity was determined, the image is routed tote video coding device 8 for the detection of the position of the field with the routing information. The so detected position is then transmitted together with the signature into a database. The associated position of the required field is transmitted to the OCR unit 4 at conformity with a stored signature and another OCR reading process is started.

Figure 2:
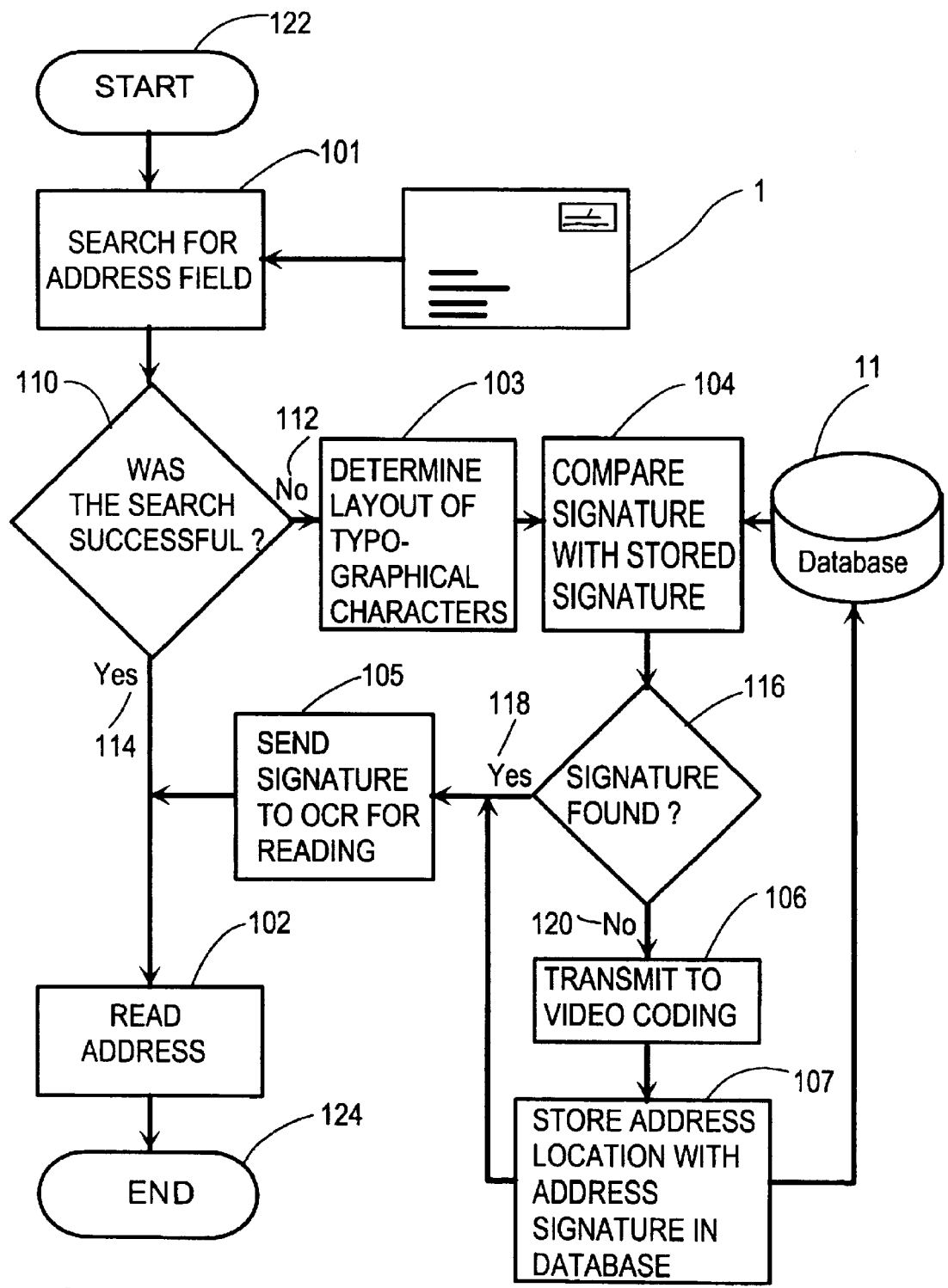
FIG. 2 a process of the method with the aid of a flow chart

The present invention will now be discussed with respect to FIG. 2. Initially 122, the searching of a field with the receiver address as routing information 101 takes place by the OCR unit 4. A query and/or determination 110 is made whether the search was successful. If the search was successful 114, the routing information or address is automatically read 102 by the OCR unit 4. If the address could not be found 112, i.e. the field with the routing information could nor be identified, then the layout of typographic characteristics is determined 103 as a signature from the digitalized image of the mail piece. The characteristics include height, width and position of for example ten largest typographic fields of a mail piece. This signature is then compared 116 with earlier determined and in a database 111 stored signatures regarding conformity or match 104. If a matching signature was found 118, the signature is stored in the database 11 as well as is transmitted 105 the position of the required field, determined by video coding, with the routing information to the OCR unit 4, for the reading process to begin. If no watching signature could be found 120, the respective image is transmitted 106 with the outcome of the OCR unit 4 (no address field found) to the video coding device 8, where a video coding assist selects the position of the required address. Following this, the video coded address location together with the associated signature is recorded 107 into the database and the address location is shared the OCR unit 4 as well.

The invention being thus described, it will be obvious that the same maybe varied in many ways. Such variations are not to be regarded as a departure from the spirit and scope of the invention, and all such modifications as would be obvious to one skilled in the art are intended to be included within the scope of the following claims.

We claim:

1. A method for locating and reading an address field on mail items, comprising the steps of:
    locating and reading said address field;
    determining if said locating and reading successfully located and read said address field;
    if said locating and reading unsuccessfully locates and reads said address field, performing the following steps:
        scanning a surface a mail item, said surface comprising said address field;
        forming a signature of said surface, said signature comprising position and outlines of a select number of typographic fields of said surface;
        searching a database for a match between said signature and another signature;
        where a match is found, importing field address information from said database associated with said another signature and repeating said step of locating and reading in said imported field address; and
        where a match is not found, forwarding scanned surface to an encoding device, manually encoding said surface, storing said signature and address field information in said database and repeating said step of locating and reading in a field address indicated in said encoding.

2. The method according to claim 1, wherein said database receives information from a plurality of sources.

3. The method according to claim 2, wherein said sources comprise networked encoding devices.

4. The method according to claim 1, wherein said database is accessible over a network.

5. The method according to claim 1, wherein said select number is 10.

6. The method according to claim 5, wherein 10 typographic fields comprise 10 largest typographic fields of said surface.

7. A system for reading an address field on mail items, comprising:
    means for locating and reading said address field;
    means for determining if said address field cannot be located and read;
    means for scanning a surface of said mail item, said surface comprising said address field;

means for forming a signature of said surface, said signature comprising position and outlines of a select number of typographic fields of said surface;

means for searching a database for a match between said signature and another signature;

means for determining if a match is found and means for importing field address information from said database associated with said another signature and repeating said step of locating and reading in said imported field address; and means for determining if a match is not found and means for forwarding scanned surface to an encoding device for manually encoding said surface, storing said signature and address field information in said database if a match is not found, and repeating said step of locating and reading in a manually encoded address field.

8. The system according to claim 7, wherein said database receives information from a plurality of sources.

9. The system according to claim 8, wherein said sources comprise networked encoding devices.

10. The system according to claim 7, wherein said database is accessible over a network.

11. The system according to claim 7, wherein said select number is 10.

12. The system according to claim 11, wherein 10 typographic fields comprise 10 largest typographic fields of said surface.

* * * * *